(12) United States Patent
Furuskog et al.

(10) Patent No.: US 11,201,650 B2
(45) Date of Patent: Dec. 14, 2021

(54) WIRELESS DEVICE, A NETWORK NODE AND METHODS THEREIN FOR HANDLING BEAMFORMED COMMUNICATION LINKS IN A WIRELESS COMMUNICATIONS NETWORK

(71) Applicant: Telefonaktiebolaget LM Ericsson (publ), Stockholm (SE)

(72) Inventors: Johan Furuskog, Stockholm (SE); Håkan Andersson, Linköping (SE); Johan Kåredal, Lund (SE); John Skördeman, Brokind (SE); Mattias Frenne, Uppsala (SE); Niclas Wiberg, Linköping (SE); Qiang Zhang, Täby (SE); Tomas Sundin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 499 days.

(21) Appl. No.: 15/762,159

(22) PCT Filed: Dec. 19, 2017

(86) PCT No.: PCT/SE2017/051298
§ 371 (c)(1),
(2) Date: Mar. 22, 2018

(87) PCT Pub. No.: WO2018/143851
PCT Pub. Date: Aug. 9, 2018

(65) Prior Publication Data
US 2019/0074879 A1    Mar. 7, 2019

Related U.S. Application Data

(60) Provisional application No. 62/453,788, filed on Feb. 2, 2017.

(51) Int. Cl.
| | |
|---|---|
| *H04B 7/06* | (2006.01) |
| *H04W 72/04* | (2009.01) |
| *H04W 72/10* | (2009.01) |
| *H04B 7/0456* | (2017.01) |
| *H04B 7/08* | (2006.01) |

(52) U.S. Cl.
CPC ......... *H04B 7/0617* (2013.01); *H04B 7/0456* (2013.01); *H04B 7/063* (2013.01);
(Continued)

(58) Field of Classification Search
CPC .. H04B 7/0617; H04B 7/0619; H04B 7/0689; H04B 7/0862; H04B 7/06; H04B 17/00;
(Continued)

(56) References Cited

U.S. PATENT DOCUMENTS

2013/0223251 A1*   8/2013   Li ..................... H04W 72/046
                                                    370/252

FOREIGN PATENT DOCUMENTS

| CN | 103748799 A | 4/2014 |
|---|---|---|
| CN | 104782056 A | 7/2015 |

(Continued)

OTHER PUBLICATIONS

Interdigital Communications, "R2-168466: Beam-based aspects for New Radio," Third Generation Partnership Project (3GPP) TSG RAN WG2 Meeting #96, Nov. 14-18, 2016, 4 pages, Reno, USA.

(Continued)

*Primary Examiner* — Nishant Divecha
(74) *Attorney, Agent, or Firm* — Sage Patent Group

(57) ABSTRACT

A method performed by a wireless device for handling two or more beamformed communication links initialized with one or more network nodes in a wireless communications network is provided. The wireless device determines at least one compatibility state for the two or more beamformed communication links based on one or more current radio signal characteristics at the wireless device for the two or (Continued)

more beamformed communication links, wherein the at least one compatibility state indicates if the wireless device currently is able to simultaneously receive transmission beams of the two or more beamformed communication links or not. The wireless device transmits information indicating the at least one determined compatibility state for the two or more beamformed communication links to at least one of the one or more network nodes. A wireless device as well as a network node and method of operation thereof are also disclosed.

22 Claims, 5 Drawing Sheets

(52) U.S. Cl.
CPC ......... *H04B 7/0628* (2013.01); *H04B 7/0689* (2013.01); *H04B 7/0695* (2013.01); *H04B 7/088* (2013.01); *H04B 7/0871* (2013.01); *H04W 72/046* (2013.01); *H04W 72/10* (2013.01)

(58) Field of Classification Search
CPC ...... H04B 7/04; H04W 24/10; H04W 72/046; H04W 52/02; H04W 52/24; H04W 52/50; H04W 72/04; H04L 12/26; H04L 12/801
See application file for complete search history.

(56) References Cited

FOREIGN PATENT DOCUMENTS

| | | |
|---|---|---|
| CN | 105164930 A | 12/2015 |
| CN | 105830496 A | 8/2016 |
| CN | 106165311 A | 11/2016 |
| EP | 1614309 B1 | 9/2010 |
| JP | 5952419 B2 | 7/2016 |

OTHER PUBLICATIONS

International Search Report and Written Opinion for International Patent Application No. PCT/SE2017/051298, dated Mar. 26, 2018, 20 pages.
First Chinese Office Action for Chinese Patent Application No. CN 201780085034.7 dated May 31, 2021, 15 pages (including English translation).
Examination Report for Indian Patent Application No. 201917021784, dated Oct. 9, 2020, 6 pages.
Examination Report for European Patent Application No. 17823242.7, dated Jul. 27, 2020, 3 pages.

\* cited by examiner

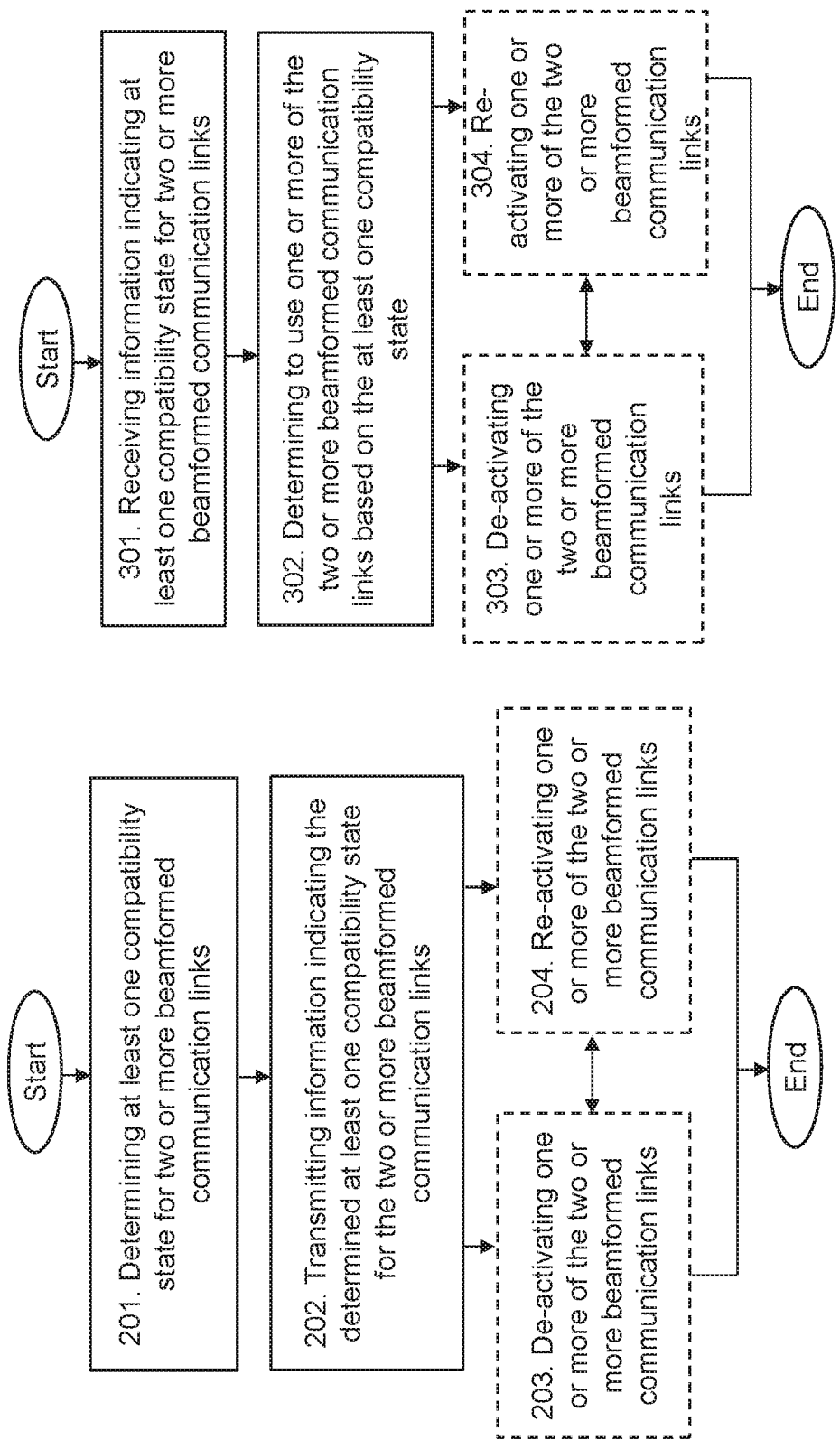

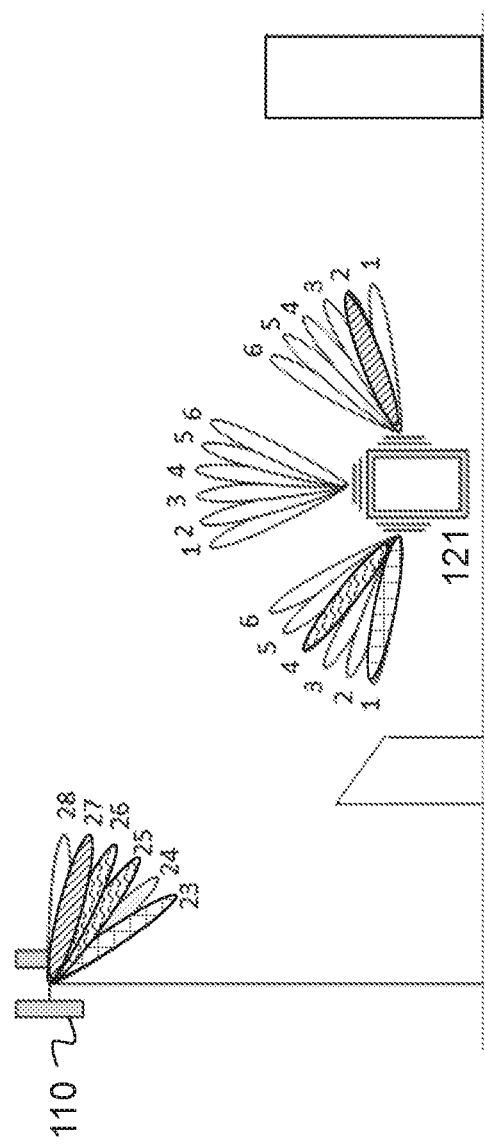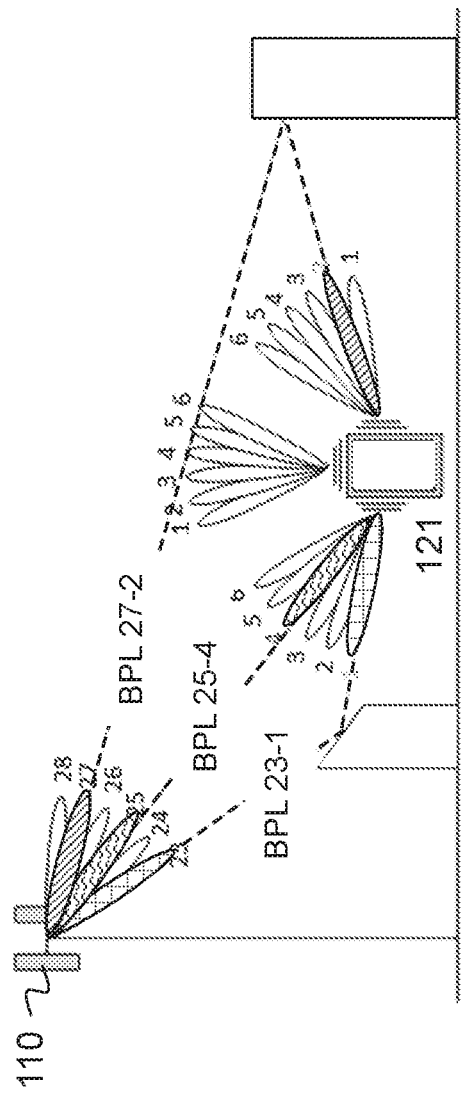

WIRELESS DEVICE, A NETWORK NODE AND METHODS THEREIN FOR HANDLING BEAMFORMED COMMUNICATION LINKS IN A WIRELESS COMMUNICATIONS NETWORK

This application is a 35 U.S.C. § 371 national phase filing of International Application No. PCT/SE2017/051298, filed Dec. 19, 2017, which claims the benefit of U.S. Provisional Application No. 62/453,788, filed Feb. 2, 2017, the disclosures of which are incorporated herein by reference in their entireties.

TECHNICAL FIELD

Embodiments herein relate to beamforming in a wireless communications network. In particular, embodiments herein relate to a wireless device and a method therein for handling two or more beamformed communication links initialized with one or more network nodes in a wireless communications network. Embodiments herein also relate to a network node and method therein for handling two or more beamformed communication links initialized with a wireless device in a wireless communication network.

BACKGROUND

Beamforming is an important technology in future radio communication systems. It may improve performance both by increasing the received signal strength, thereby improving the coverage, and by reducing unwanted interference, thereby improving the capacity. Beamforming may be applied both in a transmitter and a receiver. In a transmitter, beamforming amounts to configuring the transmitter to transmit the signal in a specific direction, or a few directions, and not in other directions. In a receiver, beamforming amounts to configuring the receiver to only receive signals from a certain direction, or a few directions, and not from other directions. When beamforming is applied in both the transmitter and the receiver for a given communication link, the combination of beams selected in the both ends may be referred to as a beamformed communication link or a Beam-Pair Link, BPL. The beamformed communication link or BPL may also be referred to as a Beam-Tracking Process, BTP. This is because it may be subject to different procedures for its maintenance. Generally, the beamforming gains are related to the widths of the used beams: a relatively narrow beam provides more gain than a wider beam.

For a more general description of beamforming, one typically talks about beamforming weights rather than beams. On the transmission side, the beamforming weights are the complex constants that the signal to be transmitted are multiplied with before being distributed to the individual antenna elements. There is a separate beamforming weight for each antenna element, which allows maximum freedom in shaping the transmission beam given the fixed antenna array. Correspondingly, on the receiving side, the received signal from each antenna element is multiplied separately with the beamforming weights before the signals are combined. However, it should be noted that in the following the somewhat simplified notion of beams, pointing in certain physical directions, is adopted for the sake of simplicity and eligibility.

Beamforming requires some form of beam management, such as beam search, beam refinement, and/or beam tracking, to determine what transmission and receiving beams, i.e. directions, to use for communication between a transmitter and a receiver. Beam search may involve the transmitter sweeping a signal across several beams, to allow a receiver in an unknown direction to receive the signal. Beam search may also involve the receiver scanning across several receive beams, thereby being able to receive a signal from an initially unknown direction. Beam search typically also involves the receiver sending a message to a transmitter to indicate which transmission beam or beams are best suited for transmission to that receiver.

Beam refinement and/or tracking is applied when a beam pair is already selected. Beam refinement is to improve an already selected transmitter or receiver beam in a beam pair for a rather static mobile environment, for instance changing the beamforming weights such that a narrower beam or beam direction providing a better link gain is obtained. Beam tracking is the continuous update of the selected beams, i.e., to replace the transmission or receiving beam in an existing beamformed communication link when the conditions change, e.g., due to mobility. Beam refinement and tracking are typically performed by temporarily evaluating a different beam than the one that is currently used for communication, and switching to that beam if it is deemed better than the current.

Beam search is about finding new beams and may take considerable time, if there are many beams to search for on both the transmitter and receiver side, and during this time communication is typically not possible. Beam refinement and tracking, on the other hand, are usually ongoing activities that cause little or no disturbance to ongoing communication.

Network nodes in a wireless communications network may transmit periodic or continuous reference signals that are semi-statically configured to support mobility and beam management, e.g. by sweeping across several transmit beams as described above. Such transmissions are here referred to as Beam Reference Signals, BRS, or Mobility Reference Signal, MRS. It is here envisioned that some aspects of beam management may then be performed by a wireless device in the wireless communications network with little or no explicit involvement from the network node, if the wireless device may assume that the network node is transmitting the BRS periodically or continuously. For instance, in some cases, wireless devices may perform beam search as part of the system-acquisition procedure. This may result in the selection of a beam in the wireless device such that by using this beam it may sufficiently well receive BRS transmitted on a certain beam of the network node. The wireless device may then perform a random-access transmission with its selected beam using a transmission resource, i.e., time and/or frequency, where it expects the network node to be able to receive random-access transmissions using that certain beam of the network node. The wireless device may continue to receive BRS even when communication is ongoing, to search for new communication paths and to perform refinement and tracking of currently used beams.

Many wireless communication networks comprise some kind of radio-link supervision, whereby the quality of the radio communication is regularly evaluated, and some action is taken in case the quality is unacceptable or the radio communication is lost. Radio-link supervision often involves a receiver checking the presence and/or evaluating the quality of a sync signal or a reference signal. It may also involve monitoring the number of retransmissions in a retransmission protocol, and monitoring the time it takes to receive a response to an earlier transmitted request message. In case any of these evaluations indicate a severe problem, the receiver or transmitter often declares a radio-link failure and initiates some action. In case of a network node having lost communication with a wireless device, the action may involve releasing some or all network resources related to that wireless device. In case of a wireless device having lost communication with a network node, the action may involve searching for sync and reference signals from that or another network node and, in case such signals are found, attempting to access the wireless communications network again via that network node. In a wireless communications network that use beamforming, this typically involves beam search.

In addition, network nodes schedule and transmit UE-specific reference signals that, among other things, may be used for beam searching, beam tracking, and beam refinement. Such signals are here referred to as Beam-Refinement Reference Signals, BRRS. Another example of a UE-specific reference signal is the Channel-State Information reference signal, CSI-RS. The CSI-RS is a reference signal scheduled by the network node for one, or possibly several, specific wireless devices, i.e. UEs, with the intention of providing measurement opportunities in the wireless device such that more detailed channel knowledge may be obtained and reported back to the network.

Finally, network nodes schedule reference signals transmitted in the uplink, UL, that, among other things, may also be used for beam searching, beam tracking, and beam refinement. Such signals may herein be referred to as Sounding Reference Signals, SRS.

To sustain a transmission link between the network node and a wireless device over time-varying conditions, e.g., due to mobility, wireless devices typically consider several possible beamformed communication links for which the beams are tracked and refined. Such beamformed communication links or BPLs that are identified jointly by the network node and the wireless device are here referred to as monitored beamformed communication links or BPLs.

Out of the monitored beamformed communication links, the network node and the wireless device agree to use at least one beamformed communication link for data and control channel reception and transmission. This at least one beamformed communication link or BPL may be referred to as an active beamformed communication link or BPL. Depending on its capabilities, a wireless device may support one or more active beamformed communication links. Whether two beamformed communication links may be simultaneously active or not depends on the implementation of the wireless device. If the beams of the wireless device associated with two beamformed communication links are realized using the same processing components, such as, e.g. antenna panels, analogue and/or digital circuitry, software units, etc., then the wireless device may not be able to transmit and receive using those beams simultaneously. If that is the case, then the beamformed communication links may be regarded as incompatible, otherwise the beamformed communication links may be regarded as compatible. During initialization of the beamformed communication links, the wireless device may transmit a compatibility indication for the beamformed communication links to the network node. Thus, the network node is informed about which of the beamformed communication links are compatible or not. This is required in the network node, since it is the network node that typically selects which beamformed communication links are to be active or monitored. Once the network node has selected a number of compatible beamformed communication links to be active, these beamformed communication links may be considered initialized and be used for transmitting data between the network node and the wireless device.

Tracking a beamformed communication link implies beam tracking and/or refinement at the network node, as well as, at the wireless device. To track a beamformed communication link, independent of whether it is active or only monitored, there must be some transmissions on which to measure and evaluate the link quality. In downlink, persistent or periodically transmitted BRS may enable tracking of the downlink transmission beam and, more slowly, of the downlink receiving beam. For faster tracking of the downlink receiving beam, scheduled BRRS may be used. In the event of downlink/uplink reciprocity, the BRS may be sufficient to track a beamformed communication link and no uplink transmissions are thus needed.

In a scenario where downlink/uplink reciprocity does not hold, the uplink and downlink links needs to be handled separately and tracking of a beamformed communication link requires uplink transmissions to maintain the beamformed communication link for the uplink. If there is currently no on-going data transmission, a SRS transmission may be scheduled to provide a reference signal on which to measure.

One duplex scheme that may be used in wireless communications network is dynamic Time-Division Duplex, TDD. Dynamic TDD means here that the transmission direction, whether it is downlink or uplink, is dynamically scheduled. In this case, the use of periodically scheduled reference signals may not be relied upon since they may only be transmitted if the direction of the duplex scheme happens to coincide with the scheduled reference signal for a given subframe.

In wireless communication networks based on Orthogonal Frequency-Division Multiplexing, OFDM, a transmission has to be received within the FFT window of the receiver to maintain the orthogonal properties of the OFDM waveform. In the downlink, the wireless device monitors the OFDM symbol timing based on synchronization and reference signals and adjusts its FFT timing correspondingly. In the uplink, the network node monitors the OFDM symbol timing. Transmissions from multiple wireless devices need to arrive approximately time-aligned at the base station and be properly received within the receiver FFT timing window. The network node determines the required timing correction for each wireless device. If the timing of a specific wireless device needs correction, the network node may issue a timing-advance, TA, command on the downlink data channel for this specific wireless device instructing the wireless device to delay or advance its timing for uplink transmission. Upon reception of a timing-advance command, the wireless device adjusts its uplink transmission timing for the uplink data channel, the uplink control channel, and SRS based on the received timing advance command.

SUMMARY

An object of the invention is to improve the handling of beamformed communication links in a wireless communications network.

According to a first aspect of embodiments herein, the object is achieved by a method performed by a wireless device for handling two or more beamformed communication links initialized with one or more network nodes in a wireless communications network. The wireless device determined at least one compatibility state for the two or more beamformed communication links based on one or more current radio signal characteristics at the wireless device for the two or more beamformed communication links, wherein the at least one compatibility state indicates if the wireless device currently is able to simultaneously receive transmission beams of the two or more beamformed communication links from the one or more network nodes or not. Also, the wireless device transmits information indicating the at least one determined compatibility state for the two or more beamformed communication links to at least one of the one or more network nodes.

According to a second aspect of embodiments herein, the object is also achieved by a wireless device for handling two or more beamformed communication links initialized with one or more network nodes in a wireless communications network. The wireless device being configured to determine at least one compatibility state for the two or more beamformed communication links based on one or more current radio signal characteristics at the wireless device for the two or more beamformed communication links, wherein the at least one compatibility state indicates if the wireless device currently is able to simultaneously receive transmission beams of the two or more beamformed communication links from the one or more network nodes or not. The wireless device is also configured to transmit information indicating the at least one determined compatibility state for the two or more beamformed communication links to at least one of the one or more network nodes.

According to a third aspect of embodiments herein, the object may be achieved by a method performed by a network node for handling two or more beamformed communication links initialized with a wireless device in a wireless communications network. The network node receives information indicating at least one compatibility state for the two or more beamformed communication links with the wireless device that is based on one or more current radio signal characteristics at the wireless device for the two or more beamformed communication links, wherein the at least one compatibility state indicates if the wireless device currently is able to simultaneously receive transmission beams of the two or more beamformed communication links or not. Also, the network node determines to use one or more of the two or more beamformed communication links based on the at least one compatibility state.

According to a fourth aspect of embodiments herein, the object is achieved by a network node for handling two or more beamformed communication links initialized with a wireless device in a wireless communications network. The network node being configured to receive information indicating at least one compatibility state for the two or more beamformed communication links with the wireless device that is based on one or more current radio signal characteristics at the wireless device for the two or more beamformed communication links, wherein the at least one compatibility state indicates if the wireless device currently is able to simultaneously receive transmission beams of the two or more beamformed communication links or not. The network node is also configured to determine to use one or more of the two or more beamformed communication links based on the at least one compatibility state.

According to a fifth aspect of the embodiments herein, computer programs are also provided configured to perform the methods described above. Further, according to a sixth aspect of the embodiments herein, carriers are also provided configured to carry the computer programs configured for performing the methods described above.

By being able to determine a compatibility state for two initialized beamformed communication links and transmit this information to a network node serving the wireless device in a wireless communications network, the wireless device and/or the network node are able to de-activate and re-activate beamformed communication links, in a compatibility sense, based on dynamic propagation conditions and capabilities of the wireless device. This also means that the wireless device and/or the network node are able to manage and support different implementations in the wireless devices of varying transmission and reception capabilities with respect to beam-pair links and adapt the behaviour to different propagation conditions. Hence, handling of beamformed communication links in a wireless communications network is improved.

Further possible features and benefits of this solution will become apparent from the detailed description below.

BRIEF DESCRIPTION OF THE DRAWINGS

Embodiments will now be described in more detail in relation to the enclosed drawings.

FIG. 2 is a flowchart depicting embodiments of a method in a wireless device, FIG. 3 is a flowchart depicting embodiments of a method in a network node, FIGS. 4-7 are schematic illustrations of beamforming signalling according to embodiments of a wireless device and a network node.

DETAILED DESCRIPTION

Figure 1:
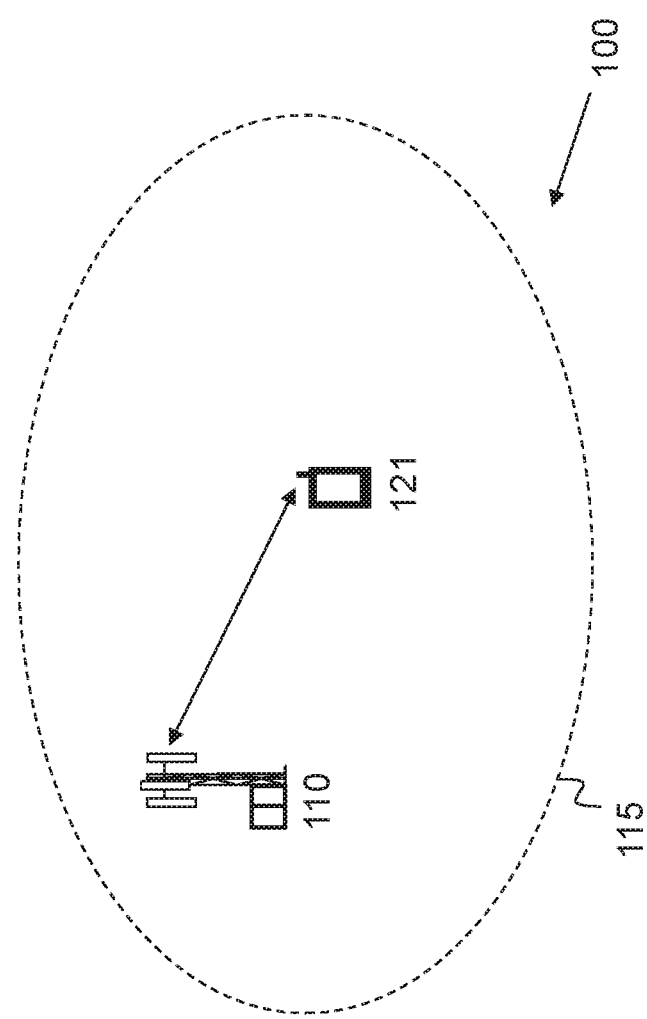
FIG. 1 is a schematic block diagram illustrating embodiments of a wireless device and a network node in a wireless communications network.

The figures herein are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless communications network 100 in which embodiments herein may operate. In some embodiments, the wireless communications network 100 may be a radio communications network such as a Long-Term Evolution (LTE) network. Although, the wireless communications network 100 is exemplified herein as an LTE network, the wireless communications network 100 may also employ technology of any one of 5G/NR, LTE-Advanced, Wideband Code-Division Multiple Access (WCDMA), Global System for Mobile communications/Enhanced Data rate for GSM Evolution (GSM/EDGE), Worldwide Interoperability for Microwave Access (WiMax), Ultra-Mobile Broadband (UMB) or GSM, or any other similar network or system. The wireless communications network 100 may also be an Ultra Dense Network, UDN, which e.g. may transmit on millimeter-waves (mmW).

The wireless communications network 100 comprises a network node 110. The network node 110 serves at least one coverage area 115. The coverage area 115 may in some cases also be referred to as a cell. The network node 110 may correspond to any type of radio network node or any network node, which communicates with a wireless communication device and/or with another network node, such as, e.g. be a base station, a radio base station, gNB, eNB, eNodeB, a Home Node B, a Home eNode B, femto Base Station (BS), pico BS, etc. Further examples of the network node 110 may also be e.g. a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc. Another example of the network node 110 may be a wireless device.

In FIG. 1, a wireless device 121 is located within the coverage area 115. The wireless device 121 is configured to communicate within the wireless communications network 100 via the network node 110 over a radio link served by the network node 110. The wireless device 121 may refer to any type of communication device or user equipment (UE) communicating with a network node and/or with another communication device in a cellular, mobile or radio communication network or system. Examples of such a wireless communication device are mobile phones, cellular phones, Personal Digital Assistants (PDAs), smart phones, tablets, sensors equipped with a UE, Laptop Mounted Equipment (LME) (e.g. USB), Laptop-Embedded Equipments (LEEs), Machine-Type Communication (MTC) devices, or Machine-to-Machine (M2M) device, Customer-Premises Equipment (CPE), target device, device-to-device (D2D) wireless device, wireless device capable of machine-to-machine (M2M) communication, etc.

It should be noted that the wireless device 121 may also be served by more than one network node 110 in the wireless communications network 100, even though this not shown in FIG. 1. It should also be noted that within the context of the present application, the term "wireless communication network", or short "network", may particularly denote a collection of nodes or entities, related transport links, and associated management needed for running a service. The service may, for example, be a wireless telephony service or packet transport service. Depending on the service, different node types or entities may be utilized to realize the service. Typical examples of a wireless communication network are radio access networks such as 2G/GSM, 3G/WCDMA, CDMA, LTE, NR/5G, etc.

Furthermore, although embodiments below are described with reference to FIG. 1, this should not be construed as limiting to the embodiments herein, but merely as an example made for illustrative purposes.

As part of the developing of the embodiments described herein, it has been realized that existing solutions only offer beamformed communication links which upon initialization are pre-defined or predetermined as compatible or incompatible, wherein the determination is based on prior signalling from the wireless devices; this, while the compatibility of beamformed communication links actually may depend on more factors than only the static factor that beamformed communication links may or may not be realized using the same components, and thus, can or cannot be simultaneously active.

For example, it has been realized that the compatibility of beamformed communication links may dynamically depend on the current propagation conditions between the network node and the wireless device, such as, for example, the propagation delay or path loss experienced by the different beamformed communication links. Some radio signal characteristics of the beamformed communication links that has been realized may affect the compatibility of the beamformed communication links are:

Time synchronization. A wireless device may utilize a single FFT timing for two beamformed communication links and will have difficulties receiving on both if the time mismatch of the signals transmitted from the network, corresponding to the different beamformed communication links, is too large when the signals are received at the wireless device.

Frequency synchronization. A wireless device may utilize a common frequency tracking, such as the same frequency-offset estimation and compensation, for two beamformed communication links and will have difficulties receiving on both if the frequency-offset mismatch of the signals transmitted by the network node, corresponding to the different beamformed communication links, is too large when the signals are received at the wireless device.

Transmission power. A wireless device may utilize common power control such that the same output power level has to be applied to transmitted signals corresponding to the different beamformed communication links, resulting in the network not being able to receive all transmitted signals if the difference in path loss between the propagation paths used by the different beamformed communication links is too large.

Reception power. A wireless device may utilize a common Automatic Gain-Control level, AGC-level, for the two beamformed communication links and will have difficulties receiving on both if the difference in strength between the signals transmitted on the different beamformed communication links is too large at the receiver of the wireless device.

Radio resources. A wireless device may be implemented such that it requires either identical or orthogonal radio resources for processing of the signals transmitted from the network node, corresponding to the different beamformed communication links, if only a single type of receiver algorithm is utilized, e.g. a MIMO receiver for identical resources or an MRC receiver for orthogonal resources. The wireless device may be unable to receive the different beamformed signals simultaneously due to lack of concurrent radio resources.

Physical radio resources. During the tracking and updating of a beamformed communication link, the physical radio resources, e.g., an antenna array, required to receive a beamformed communication link may change. For example, rotating a wireless device equipped with two antenna arrays facing opposite sides would make only one antenna array useful for receiving and/or transmitting on that beamformed communication link depending on which antenna array that is facing the network node. Here, the line-of-sight use case is a simple example. As such, whether or not two beamformed communication links use the same physical radio resources may change over time, thus making the compatibility of those beamformed communication links time-varying.

Hence, depending on such radio signal characteristics as described above, the compatibility of the beamformed communication links may vary over time due to mobility and traffic situation.

This issue is addressed by the wireless device 121 and network node 110 as described according to the embodiments herein. The wireless device 121 and network node 110 as described in the embodiments herein enable the compatibility of the beamformed communication links to respond to, for example, changes in propagation conditions and/or scheduling decisions instead of being statically configured upon initialization. The wireless device 121 and network node 110 also introduces mechanisms that allow beamformed communication links to be de-activated and re-activated in the sense of compatibility based on dynamic propagation conditions and capabilities of the wireless device 121. In other words, the wireless device 121 and network node 110 as described in the embodiments herein may provide mechanisms for the wireless communications network 100 to manage and support different UE implementations of varying transmission and reception capabilities with respect to beam-pair links and adapt the behaviour to different propagation conditions.

Example of embodiments of a method performed by a wireless device 121 for handling two or more beamformed communication links initialized with one or more network nodes 110 in a wireless communications network 100, will now be described with reference to the flowchart depicted in FIG. 2. FIG. 2 illustrates an example of actions or operations which may be taken by the wireless device 121.

Actions 201

The wireless device 121 determines at least one compatibility state for the two or more beamformed communication links based on one or more current radio signal characteristics at the wireless device 121 for the two or more beamformed communication links. The at least one compatibility state here indicates if the wireless device 121 currently is able to simultaneously receive transmission beams of the two or more beamformed communication links from the one or more network nodes 110 or not. It should be noted that the wireless device may also be referred to here as a terminal or User Equipment, UE. Furthermore, the at least one compatibility state may also be referred to as at least one updated, transitioned or altered compatibility state, since it refers to a compatibility state that has changed, transitioned, or been altered after first having been determined when initializing the two or more beamformed communications links. The transmission beams may also be denoted Tx-beams. It should be noted that the compatibility state of beamformed communication links indicate whether or not the beamformed communication links are compatible or not, i.e. whether the beamformed communication links may be simultaneously active or not.

It should also be noted that, before the wireless device 121 determines the at least one compatibility state, the network node 110 and the wireless device 121 may be identified as a beam pair. Between this beam pair, beamformed communication links may be configured, i.e. configured between the network node 110 and a wireless device 121. The wireless device 121 may provide reports on the compatibility, i.e. compatibility state, of the beamformed communication links to the network node 110 prior to its initialization. The beamformed communications links between the network node 110 and the wireless device 121 may then be initialized and configured accordingly. However, according to some embodiments and as described in this Action 201, the wireless device 121 may also determine the compatibility state of the beamformed communication links to the network node 110 after the initialization of the beamformed communication links. This may also be indicated to the network node 110 as described in Action 202 below.

In some embodiments, the wireless device 121 may further determine the at least one compatibility state to indicate that the wireless device 121 is no longer able to, or has become able to, simultaneously receive transmission beams of two or more beamformed communication links when:

a timing mismatch between the signals of the transmission beams of the two or more beamformed communication links has passed a threshold value;

a frequency-offset mismatch between the signals of the transmission beams of the two or more beamformed communication links has passed a threshold value;

the difference in propagation path loss between the signals of the transmission beams of the two or more beamformed communication links has passed a threshold value;

the difference in received signal strength between the signals of the transmission beams of the two or more beamformed communication links has passed a threshold value;

different receiver algorithms are determined to be used for the signals of the transmission beams of the two or more beamformed communication links;

different physical radio resources are determined to be used for the signals of the transmission beams of the two or more beamformed communication links; and/or the same or overlapping physical radio resources are determined to be used for the signals of the transmission beams, wherein different physical radio resources was previously used by the two or more beamformed communication links.

The above examples are examples of current radio signal characteristics that the wireless device 121 may use when determining at least one compatibility state after the two or more beamformed communications links have been initialized.

Action 202

After determining the at least one compatibility state for the two or more beamformed communication links in Action 201, the wireless device 121 may transmit information indicating the at least one determined compatibility state for the two or more beamformed communication links to at least one of the one or more network nodes 110. Here, it should be noted that the information indicating the at least one determined compatibility state for the two or more beamformed communication links may, for example, be explicitly indicated by the wireless device 121 by, e.g. an indicator or bit information, or implicitly by only reporting the transmission beams of the beamformed communication links which may be received simultaneously at the wireless device 121. In the latter case, the network node 110 may be configured to interpret the indicated transmission beams as compatible.

In some embodiments, the wireless device 121 may perform the transmitting of the information indicating the at least one determined compatibility state for the two or more beamformed communication links to at least one of the one or more network nodes as part of a periodical transmission to at least one of the one or more network nodes comprising the at least one compatibility state for the two or more beamformed communication links. This means that the wireless device 121 may periodically transmit a message to the network node 110 indicating the compatibility state of the beamformed communication links.

Alternatively, according to some embodiments, the transmitting of the information indicating the at least one determined compatibility state for the two or more beamformed communication links to at least one of the one or more network nodes may be triggered in the wireless device 121 by the wireless device 121 detecting a change in the at least one compatibility state when determining the at least one compatibility state for the two or more beamformed communication links. This means that the wireless device 121 may transmit the message indicating the compatibility state of the beamformed communication links when triggered by an incompatibility event resulting in two beamformed communication links becoming incompatible, e.g. that the timing difference or the received power difference, etc., becomes too large. Also, the wireless device 121 may transmit the message indicating the compatibility state of the beamformed communication links when triggered by a compatibility event resulting in two beamformed communication links becoming compatible. Here, it should be noted that the incompatibility event and the compatibility event may be any of the examples described in Action 201 for when the compatibility state indicates that the wireless device 121 is no longer able to, or has become able to, simultaneously receive transmission beams of two or more beamformed communication links.

Action 203

Optionally, the wireless device 121 may also, according to some embodiments, de-activate one or more of the two or more beamformed communication links in case the at least one compatibility state indicates that the wireless device is no longer able to simultaneously receive the transmission beams of two or more beamformed communication links from the one or more network nodes. This means that the wireless device 121 may be configured to de-activate a beamformed communication link if it becomes incompatible or compatible with another beamformed communication link.

In this case, according to some embodiments, the wireless device 121 may also select the one or more of the two or more beamformed communication links to be de-activated based on, for example:

- a configured priority of the two or more beamformed communication links;
- a quality indicator of the two or more beamformed communication links; or
- the order in which the two or more beamformed communication links were activated.

This means that the wireless device 121 may select the beamformed communication link to de-activate or re-active based on one or more of: a configured priority or order; a beamformed communication link quality, e.g. in terms of received signal strength or Signal-to-Interference-plus-Noise ratio, SINR; and the activation order of the beamformed communication links starting with the last or first activated beamformed communication link.

In some embodiments, the de-activation may trigger the wireless device 121 to transmit an indication of the de-activation to the network node 110.

Action 204

Optionally, the wireless device 121 may also, according to some embodiments, re-activate one or more of the two or more beamformed communication links in case the at least one compatibility state indicates that the wireless device has become able to simultaneously receive the transmission beams of two or more beamformed communication links from the one or more network nodes.

This means that the wireless device 121 may be configured to re-activate a beamformed communication link if it becomes compatible with another beamformed communication link. In this case, in some embodiments, the wireless device 121 may select the beamformed communication link to re-active based on one or more of: a configured priority or order; a beamformed communication link quality, e.g. in terms of received signal strength or Signal-to-Interference-plus-Noise ratio, SINR; and the activation order of the beamformed communication links starting with the last or first activated beamformed communication link.

Further embodiments of the wireless device 121 are described below with reference to FIGS. 4-8.

Example of embodiments of a method performed by a network node 110 for handling two or more beamformed communication links initialized with a wireless device 121 in a wireless communications network 100, will now be described with reference to the flowchart depicted in FIG. 3. FIG. 3 illustrates an example of actions or operations which may be taken by the network node 110.

Actions 301

The network node 110 receives information indicating at least one compatibility state for the two or more beamformed communication links with the wireless device that is based on one or more current radio signal characteristics at the wireless device 121 for the two or more beamformed communication links. The at least one compatibility state here indicates if the wireless device 121 currently is able to simultaneously receive transmission beams of the two or more beamformed communication links or not. The information indicating the at least one determined compatibility state for the two or more beamformed communication links may, for example, be explicitly indicated by e.g. an indicator or bit information, or implicitly by only receiving information indicating the transmission beams of the beamformed communication links which may be received simultaneously at the wireless device 121. In the latter case, the network node 110 may be configured to interpret the indicated transmission beams as compatible.

Action 302

After receiving the information in Action 301, the network node 110 may determine to use one or more of the two or more beamformed communication links based on the at least one compatibility state.

Action 303

In response to the determination in Action 302, the network node 110 may optionally, according to some embodiments, de-activate one or more of the two or more beamformed communication links in case the at least one compatibility state indicates that the wireless device is no longer able to simultaneously receive the transmission beams of two or more beamformed communication links. In this case, according to some embodiments, the network node 110 may also select the one or more of the two or more beamformed communication links to be de-activated based on, for example:

- a configured priority of the two or more beamformed communication links;
- a quality indicator of the two or more beamformed communication links; or
- the order in which the two or more beamformed communication links were activated.

Action 304

In response to the determination in Action 302, the network node 110 may optionally, according to some embodiments, re-activate one or more of the two or more beamformed communication links in case the at least one compatibility state indicates that the wireless device has become able to simultaneously receive the transmission beams of two or more beamformed communication links.

Further embodiments of the network node 110 are described below with reference to FIGS. 4-7 and 9.

FIGS. 4-8 illustrates schematic illustrations of beamforming signalling according to embodiments of the wireless device 121 and the network node 110.

In FIG. 4, the wireless device 121 may send three BRS reports that are detected by the network node 110. For example, the wireless device 121 may transmit a first BRS report using Tx-beam 1 from a first array of Tx-beams (i.e. Tx-beams 1-6 facing the network node 110 in FIG. 4) that is detected at the network node 110, e.g. by the Rx-beam 23. This is also indicated in FIG. 4 by the squared-marked beams. It should be noted that Tx-beams refers to transmission beams, and Rx-beams refers to receiving beams. The wireless device 121 also transmits a second BRS report using Tx-beam 4 from the same first array of Tx-beams that is detected at the network node 110, e.g. by the Rx-beams 25, 26. This is also indicated in FIG. 4 by the wavy-marked beams. Furthermore, the wireless device 121 transmits a third BRS report using Tx-beam 2 from a third array of Tx-beams (i.e. beams 1-6 facing away from the network node 110 in FIG. 4) that is detected at the network node 110, e.g. by Rx-beam 27. This is also indicated in FIG. 4 by the dashed marked beams. No BRS reports are detected from the second array of Tx-beams (i.e. beams 1-6 facing upwards in FIG. 4) at the wireless device 121 by the network node 110.

In FIG. 5, the network node 110 may determine and monitor three different beamformed communication links BPL 23-1, BPL 25-4 and BPL 27-2 based on the detected BRS reports as described above with reference to FIG. 4. The network node 110 may, for example, determine that the three different beamformed communication links BPL 23-1, BPL 25-4 and BPL 27-2 are incompatible, i.e. the wireless device 121 cannot simultaneously receive transmission beams of any combination of the beamformed communication links BPL 23-1, BPL 25-4, and BPL 27-2 from the one or more network nodes 110. Thereafter, the beamformed communication links BPL 23-1, BPL 25-4 and BPL 27-2 may be initialized accordingly.

Figure 6:
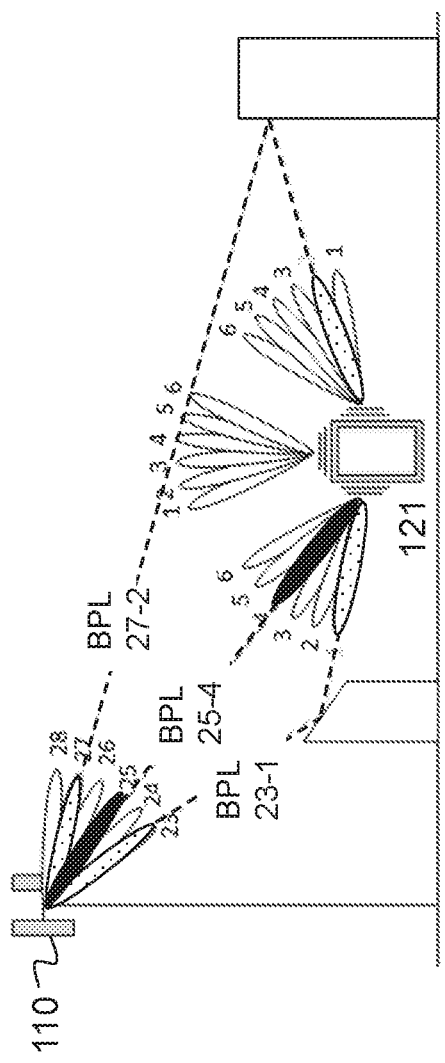

In FIG. 6, the network node 110 may determine that the beamformed communication link BPL 25-4 is the beamformed communication link that is to be active. This is indicated in FIG. 6 by the fully-marked, or solidly-marked, beams. However, all beamformed communication links BPL 23-1, BPL 25-4 and BPL 27-2 may be continuously monitored using measurements and reporting. This is indicated in FIG. 6 by the dotted marked beams.

Figure 7:
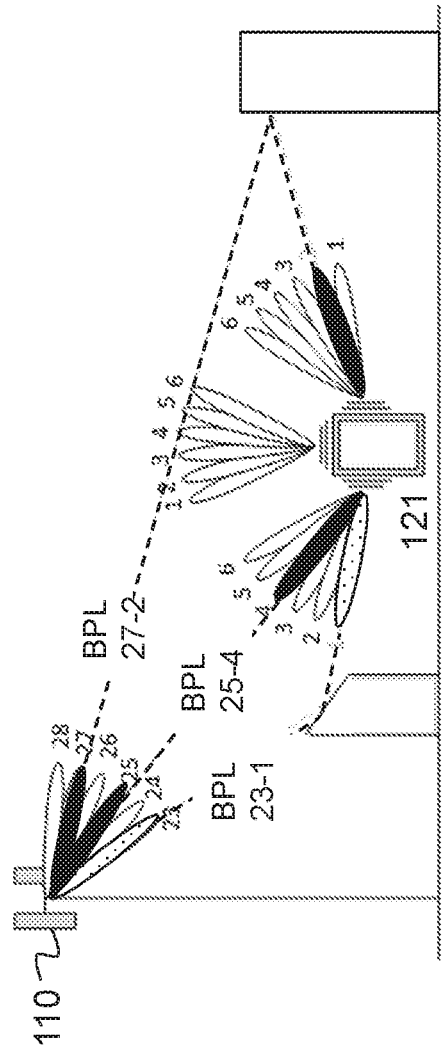

In FIG. 7, the wireless device 121 may determine the compatibility state for the beamformed communication links BPL 25-4 and BPL 27-2 based on one or more current radio signal characteristics at the wireless device 121 for the beamformed communication links BPL 25-4 and BPL 27-2. For example, the difference in the currently received signal strength between the signals of the transmission beams of the beamformed communication links BPL 25-4 and BPL 27-2 has fallen below a predetermined threshold value, thus making the beamformed communication links BPL 25-4 and BPL 27-2 compatible again. This may trigger the wireless device 121 to transmit information indicating that the beamformed communication links BPL 25-4 and BPL 27-2 are compatible again to the network node 110. The network node 110 may then, for example, determine to activate the beamformed communication links BPL 27-2 as well. This is indicated in FIG. 7 by the fully-marked, or solidly-marked, beams. Alternatively, it may trigger the wireless device 121 to determine to activate the beamformed communication links BPL 27-2 itself. The wireless device 121 may in this case transmit an indication of the activation to the network node 110.

Figure 9:
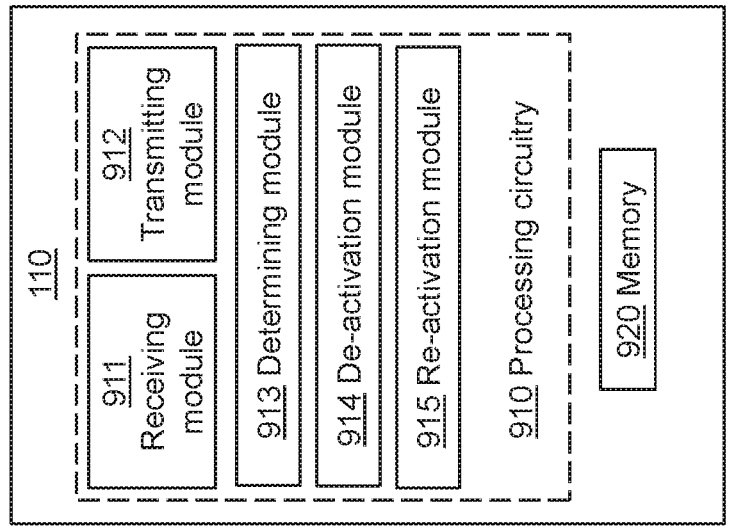
FIG. 9 is a schematic block diagram depicting embodiments of a network node.
Figure 8:
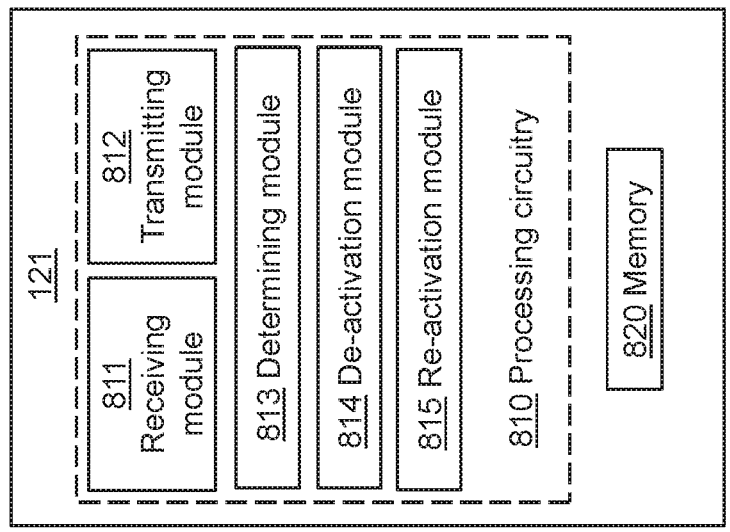
FIG. 8 is a schematic block diagram depicting embodiments of a wireless device.

To perform the method actions described herein a wireless device 121 and a network node 110 are provided. FIGS. 8-9 are block diagrams depicting the wireless device 121 and the network node 110, respectively. The wireless device 121 is configured to perform the methods described for a wireless device 121 according to embodiments herein, while the network node 110 is configured to perform the methods described for a network node 110 according to embodiments herein.

The embodiments herein for handling two or more beamformed communication links initialized with one or more network nodes 110 in a wireless communications network 100 may be implemented through one or more processors 810 in the wireless device 121 depicted in FIG. 8, together with computer program code for performing the functions and/or method actions of the embodiments herein. The one or more processor may also be referred to and/or be comprised in a processing circuitry 810. The program code mentioned above may also be provided as a computer program product, for instance in the form of a data carrier carrying computer program code for performing embodiments herein when being loaded into the wireless device 121. One such carrier may be in the form of a CD ROM disc. It is however feasible with other data carriers such as a memory stick. The computer program code may furthermore be provided as pure program code on a server and downloaded to the wireless device 121.

The wireless device 121 may comprise a receiving module 811, or receiver (Rx), and a transmitting module 812, or transmitter (Tx), over which the wireless device 121 may transmit/receive signals to other nodes, such as, e.g. the network node 110 or other wireless devices. The receiving and transmitting modules 811, 812 may also be incorporated into a single transceiver or communications unit.

Also, the wireless device 121 may comprise a determining module 813 for determining at least one compatibility state for the two or more beamformed communication links based on one or more current radio signal characteristics at the wireless device 121 for the two or more beamformed communication links according to embodiments described herein. Here, the at least one compatibility state indicates if the wireless device 121 currently is able to simultaneously receive transmission beams of the two or more beamformed communication links from the one or more network nodes 110 or not. The transmitting module 812 may also be configured to transmit information indicating the at least one determined compatibility state for the two or more beamformed communication links to at least one of the one or more network nodes 110.

Furthermore, the wireless device 121 may comprise a de-activation module 814 for de-activating one or more of the two or more beamformed communication links in case the at least one compatibility state indicates that the wireless device 121 is no longer able to simultaneously receive the transmission beams of two or more beamformed communication links from the one or more network nodes 110. The wireless device 121 may also comprise a re-activation module 815 for re-activating one or more of the two or more beamformed communication links in case the at least one compatibility state indicates that the wireless device 121 has become able to simultaneously receive the transmission beams of two or more beamformed communication links from the one or more network nodes 110.

The wireless device 121 further comprises a memory 820. The memory 820 may, for example, be used to store applications or programs to perform the methods herein and/or any information used by such applications or programs.

The embodiments herein for handling two or more beamformed communication links initialized with a wireless device 121 in a wireless communications network 100 may be implemented through one or more processors 910 in the network node 110 depicted in FIG. 9, together with computer program code for performing the functions and/or method actions of the embodiments herein. The one or more processor may also be referred to and/or be comprised in a processing circuity 910. The program code mentioned above may also be provided as a computer program product, for instance in the form of a data carrier carrying computer program code for performing embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 comprises a receiving module 911, or receiver (RX), and a transmitting module 912, or transmitter (TX), over which the network node 110 may transmit/receive signals to other nodes, such as, e.g. the wireless device 121 or other wireless devices or network nodes. The receiving and transmitting modules 911, 912 may also be incorporated into a single transceiver or communications unit.

The receiving module 111 may be configured to receive information indicating at least one compatibility state for the two or more beamformed communication links with the wireless device 121 that is based on one or more current radio signal characteristics at the wireless device 121 for the two or more beamformed communication links, wherein the at least one compatibility state indicates if the wireless device 121 currently is able to simultaneously receive transmission beams of the two or more beamformed communication links or not. Also, the network node 110 may comprise a determining module 913 configured to determine to use one or more of the two or more beamformed communication links based on the at least one compatibility state according to embodiments described herein.

Furthermore, the network node 110 may comprise a de-activation module 914 for de-activating one or more of the two or more beamformed communication links in case the at least one compatibility state indicates that the wireless device 121 is no longer able to simultaneously receive the transmission beams of two or more beamformed communication links. The network node 110 may also comprise a re-activation module 915 for re-activating one or more of the two or more beamformed communication links in case the at least one compatibility state indicates that the wireless device 121 has become able to simultaneously receive the transmission beams of two or more beamformed communication links.

The network node 110 further comprises a memory 920. The memory 920 may, for example, be used to store applications or programs to perform the methods herein and/or any information used by such applications or programs. The network node 110 may further comprise an input/output interface (not shown), which may be used to communicate over a wired connection with other radio network entities or nodes (not shown) in the wireless communications network 100.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of processing circuits discussed may be provided through the use of dedicated hardware, while others are provided with hardware for executing software, in association with the appropriate software or firmware. Thus, the term "processor" or "controller" as may be used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices. The different actions taken by the different nodes may be implemented with different circuits.

From the above it may be seen that the embodiments may further comprise a computer program product, comprising instructions which, when executed on at least one processor, e.g. the processors 810, 910, cause the at least one processor to carry out the method for handling transmissions in the wireless communications network 100. Also, some embodiments may, as described above, further comprise a carrier containing said computer program, wherein the carrier is one of an electronic signal, optical signal, radio signal, or computer readable storage medium.

Further Aspects

According to a first additional aspect of the embodiments described herein, it is also presented a wireless device comprising a processing circuitry and a memory, wherein the memory is containing instructions executable by the processing circuitry and the processing circuitry is configured to: determine at least one compatibility state for the two or more beamformed communication links based on one or more current radio signal characteristics at the wireless device for the two or more beamformed communication links, wherein the at least one compatibility state indicates if the wireless device currently is able to simultaneously receive transmission beams of the two or more beamformed communication links from the one or more network nodes or not, and to transmit information indicating the at least one determined compatibility state for the two or more beamformed communication links to at least one of the one or more network nodes.

The processing circuitry may further be configured to: de-active one or more of the two or more beamformed communication links in case the at least one compatibility state indicates that the wireless device is not able to simultaneously receive the transmission beams of two or more beamformed communication links from the one or more network nodes. The processing circuitry may further be configured to: select the one or more of the two or more beamformed communication links to be de-activated based on: a configured priority of the two or more beamformed communication links; a quality indicator of the two or more beamformed communication links; or the order in which the two or more beamformed communication links were activated. The processing circuitry may further be configured to: re-activate one or more of the two or more beamformed communication links in case the at least one compatibility state indicates that the wireless device is able to simultaneously receive the transmission beams of two or more beamformed communication links from the one or more network nodes.

The processing circuitry described above, wherein the one or more current radio signal characteristics based on which the wireless device determines the at least one compatibility state is one or more of: a timing mismatch between the signals of the transmission beams of the two or more beamformed communication links; a frequency-offset mismatch between the signals of the transmission beams of the two or more beamformed communication links; the difference in propagation path loss between the signals of the transmission beams of the two or more beamformed communication links; the difference in received signal strength between the signals of the transmission beams of the two or more beamformed communication links; a difference in receiver algorithms are determined to be used for the signals of the transmission beams of the two or more beamformed communication links; and different physical radio resources are determined to be used for the signals of the transmission beams of the two or more beamformed communication links.

The processing circuitry may further be configured to: transmit the information indicating the at least one determined compatibility state for the two or more beamformed communication links as part of a periodical transmission to at least one of the one or more network nodes. The processing circuitry described above, wherein the transmission of the information indicating the at least one determined compatibility state for the two or more beamformed communication links is triggered in the wireless device by detecting a change in the at least one compatibility state when determining the at least one compatibility state for the two or more beamformed communication links.

According to a second additional aspect of the embodiments described herein, it is also presented a network node comprising a processing circuitry and a memory, wherein the memory is containing instructions executable by the processing circuitry and the processing circuitry is configured to: receive information indicating at least one compatibility state for the two or more beamformed communication links with the wireless device that is based on one or more current radio signal characteristics at the wireless device for the two or more beamformed communication links, wherein the at least one compatibility state indicates if the wireless device currently is able to simultaneously receive transmission beams of the two or more beamformed communication links or not, and determine to use one or more of the two or more beamformed communication links based on the at least one compatibility state.

The processing circuitry may further be configured to: de-activate one or more of the two or more beamformed communication links in case the at least one compatibility state indicates that the wireless device is not able to simultaneously receive the transmission beams of two or more beamformed communication links. The processing circuitry may further be configured to: select the one or more of the two or more beamformed communication links to be de-activated based on: a configured priority of the two or more beamformed communication links; a quality indicator of the two or more beamformed communication links; or the order in which the two or more beamformed communication links were activated. The processing circuitry may further be configured to: re-activate one or more of the two or more beamformed communication links in case the at least one compatibility state indicates that the wireless device is able to simultaneously receive the transmission beams of two or more beamformed communication links.

The terminology used in the detailed description of the particular embodiments illustrated in the accompanying drawings is not intended to be limiting of the described communication node or method therein.

As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

BRS Beam Reference Signals
BPL Beam-Pair Link
BTP Beam-Tracking Process
BRRS Beam-Refinement Reference Signals
CSI-RS Channel-State Information Reference Signal,
eNB Enhanced NodeB
FFT Fast-Fourier Transform
LTE Long-Term Evolution
MRS Mobility Reference Signal
OFDM Orthogonal Frequency-Division Multiplexing
Rx Reception
SRS Sounding Reference Signal
TA Timing Advance
TDD Time-Division Duplex
Tx Transmission
UE User Equipment

The invention claimed is:

1. A method performed by a wireless device for handling two or more beamformed communication links initialized with one or more network nodes in a wireless communications network, comprising:
   determining at least one compatibility state for the two or more beamformed communication links based on one or more current radio signal characteristics at the wireless device for the two or more beamformed communication links,
   wherein the at least one compatibility state indicates if the wireless device currently is able to simultaneously receive transmission beams of the two or more beamformed communication links from the one or more network nodes or not; and
   transmitting information indicating the at least one determined compatibility state for the two or more beamformed communication links to at least one of the one or more network nodes.

2. The method according to claim 1, further comprising:
   de-activating one or more of the two or more beamformed communication links in case the at least one compatibility state indicates that the wireless device is not able to simultaneously receive the transmission beams of two or more beamformed communication links from the one or more network nodes.

3. The method according to claim 2, further comprising selecting the one or more of the two or more beamformed communication links to be de-activated based on:
   a configured priority of the two or more beamformed communication links;
   a quality indicator of the two or more beamformed communication links; or
   the order in which the two or more beamformed communication links were activated.

4. The method according to claim 2, further comprising:
   re-activating one or more of the two or more beamformed communication links in case the at least one compatibility state indicates that the wireless device is able to simultaneously receive the transmission beams of two or more beamformed communication links from the one or more network nodes.

5. The method according to claim 1, wherein the one or more current radio signal characteristics based on which the wireless device determines the at least one compatibility state is one or more of:
   a timing mismatch between the signals of the transmission beams of the two or more beamformed communication links;
   a frequency-offset mismatch between the signals of the transmission beams of the two or more beamformed communication links;
   the difference in propagation path loss between the signals of the transmission beams of the two or more beamformed communication links;
   the difference in received signal strength between the signals of the transmission beams of the two or more beamformed communication links;
   a difference in receiver algorithms are determined to be used for the signals of the transmission beams of the two or more beamformed communication links; and
   different physical radio resources are determined to be used for the signals of the transmission beams of the two or more beamformed communication links.

6. The method according to claim 1, wherein the transmitting is part of a periodical transmission to at least one of the one or more network nodes comprising the at least one compatibility state for the two or more beamformed communication links.

7. The method according to claim 1, wherein the transmitting is triggered by detecting a change in the at least one compatibility state when determining the at least one compatibility state for the two or more beamformed communication links.

8. A wireless device for handling two or more beamformed communication links initialized with one or more network nodes in a wireless communications network, wherein the wireless device comprises a processor that is configured to:
   determine at least one compatibility state for the two or more beamformed communication links based on one or more current radio signal characteristics at the wireless device for the two or more beamformed communication links, wherein the at least one compatibility state indicates if the wireless device currently is able to simultaneously receive transmission beams of the two or more beamformed communication links from the one or more network nodes or not, and
   transmit information indicating the at least one determined compatibility state for the two or more beamformed communication links to at least one of the one or more network nodes.

9. The wireless device according to claim 8, wherein the processor is further configured to de-active one or more of the two or more beamformed communication links in case the at least one compatibility state indicates that the wireless device is not able to simultaneously receive the transmission beams of two or more beamformed communication links from the one or more network nodes.

10. The wireless device according to claim 9, wherein the processor is further configured to select the one or more of the two or more beamformed communication links to be de-activated based on: a configured priority of the two or more beamformed communication links; a quality indicator of the two or more beamformed communication links; or the order in which the two or more beamformed communication links were activated.

11. The wireless device according to claim 9, wherein the processor is further configured to re-activate one or more of the two or more beamformed communication links in case the at least one compatibility state indicates that the wireless device is able to simultaneously receive the transmission beams of two or more beamformed communication links from the one or more network nodes.

12. The wireless device according to claim 8, wherein the one or more current radio signal characteristics based on which the wireless device determines the at least one compatibility state is one or more of:
   a timing mismatch between the signals of the transmission beams of the two or more beamformed communication links;
   a frequency-offset mismatch between the signals of the transmission beams of the two or more beamformed communication links;
   the difference in propagation path loss between the signals of the transmission beams of the two or more beamformed communication links;
   the difference in received signal strength between the signals of the transmission beams of the two or more beamformed communication links;
   a difference in receiver algorithms are determined to be used for the signals of the transmission beams of the two or more beamformed communication links; and different physical radio resources are determined to be used for the signals of the transmission beams of the two or more beamformed communication links.

13. The wireless device according to claim 8, wherein the processor is further configured to transmit the information indicating the at least one determined compatibility state for the two or more beamformed communication links as part of a periodical transmission to at least one of the one or more network nodes.

14. The wireless device according to claim 8, wherein the transmission of the information indicating the at least one determined compatibility state for the two or more beamformed communication links is triggered in the wireless device by detecting a change in the at least one compatibility state when determining the at least one compatibility state for the two or more beamformed communication links.

15. A method performed by a network node for handling two or more beamformed communication links initialized with a wireless device in a wireless communications network, comprising:
   receiving information indicating at least one compatibility state for the two or more beamformed communication links with the wireless device that is based on one or more current radio signal characteristics at the wireless device for the two or more beamformed communication links, wherein the at least one compatibility state indicates if the wireless device currently is able to simultaneously receive transmission beams of the two or more beamformed communication links or not; and
   determining to use one or more of the two or more beamformed communication links based on the at least one compatibility state.

16. The method according to claim 15, further comprising:
   de-activating one or more of the two or more beamformed communication links in case the at least one compatibility state indicates that the wireless device is not able to simultaneously receive the transmission beams of two or more beamformed communication links.

17. The method according to claim 16, further comprising selecting the one or more of the two or more beamformed communication links to be de-activated based on:
   a configured priority of the two or more beamformed communication links;
   a quality indicator of the two or more beamformed communication links; or
   the order in which the two or more beamformed communication links were activated.

18. The method according to claim 16, further comprising:
   re-activating one or more of the two or more beamformed communication links in case the at least one compatibility state indicates that the wireless device is able to simultaneously receive the transmission beams of two or more beamformed communication links.

19. A network node for handling two or more beamformed communication links initialized with a wireless device in a wireless communications network, wherein the network node comprises a processor that is configured to:
   receive information indicating at least one compatibility state for the two or more beamformed communication links with the wireless device that is based on one or more current radio signal characteristics at the wireless device for the two or more beamformed communication links, wherein the at least one compatibility state indicates if the wireless device currently is able to simultaneously receive transmission beams of the two or more beamformed communication links or not, and
   determine to use one or more of the two or more beamformed communication links based on the at least one compatibility state.

20. The network node according to claim 19, wherein the processor is further configured to:
   de-activate one or more of the two or more beamformed communication links in case the at least one compatibility state indicates that the wireless device is not able to simultaneously receive the transmission beams of two or more beamformed communication links.

21. The network node according to claim 20, wherein the processor is further configured to select the one or more of the two or more beamformed communication links to be de-activated based on:
   a configured priority of the two or more beamformed communication links;
   a quality indicator of the two or more beamformed communication links; or
   the order in which the two or more beamformed communication links were activated.

22. The network node according to claim 20, wherein the processor is further configured to:
   re-activate one or more of the two or more beamformed communication links in case the at least one compatibility state indicates that the wireless device is able to simultaneously receive the transmission beams of two or more beamformed communication links.

* * * * *